(12) United States Patent
Yuasa

(10) Patent No.: US 7,859,512 B2
(45) Date of Patent: Dec. 28, 2010

(54) COLOR IMAGE DISPLAY PANEL AND DRIVING METHOD THEREOF

(75) Inventor: Satoshi Yuasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1275 days.

(21) Appl. No.: 10/543,018

(22) PCT Filed: Mar. 5, 2004

(86) PCT No.: PCT/JP2004/002931

§ 371 (c)(1),
(2), (4) Date: Jul. 22, 2005

(87) PCT Pub. No.: WO2004/079439

PCT Pub. Date: Sep. 16, 2004

(65) Prior Publication Data

US 2006/0061530 A1    Mar. 23, 2006

(30) Foreign Application Priority Data

Mar. 5, 2003    (JP)    ............................... 2003-058561

(51) Int. Cl.
*G09G 3/34*    (2006.01)
(52) U.S. Cl. ...................................... 345/107; 359/296
(58) Field of Classification Search .................. 345/84, 345/87, 88, 107; 349/97, 110, 115, 129; 359/267, 242, 281, 282
See application file for complete search history.

(56) References Cited

U.S. PATENT DOCUMENTS

| | | | | |
|---|---|---|---|---|
| 4,261,653 A * | 4/1981 | Goodrich | ..................... | 359/296 |
| 4,779,962 A | 10/1988 | Nishimura et al. | .......... | 350/355 |
| 4,886,343 A | 12/1989 | Johnson | ....................... | 350/335 |
| 5,007,714 A | 4/1991 | Nishimura et al. | .......... | 350/353 |
| 5,642,125 A | 6/1997 | Silverstein et al. | ............ | 345/87 |
| 5,892,497 A * | 4/1999 | Robertson | .................... | 345/107 |
| 6,115,012 A * | 9/2000 | Eguchi et al. | .................. | 345/84 |
| 6,573,961 B2 * | 6/2003 | Jiang et al. | ................... | 349/115 |
| 6,906,851 B2 | 6/2005 | Yuasa | .......................... | 359/296 |
| 7,034,987 B2 * | 4/2006 | Schlangen | ................... | 345/107 |
| 2002/0085155 A1 * | 7/2002 | Arikawa | ...................... | 349/129 |

FOREIGN PATENT DOCUMENTS

| | | |
|---|---|---|
| EP | 0 151 846 | 8/1985 |
| EP | 0 347 790 | 12/1989 |
| EP | 0 579 382 | 1/1994 |
| JP | 02-110430 | 4/1990 |
| JP | 06-123893 | 5/1994 |
| JP | 10-68967 | 3/1998 |
| JP | 11-84403 | 3/1999 |

OTHER PUBLICATIONS

"The Contrast Sensitivity of Human Colour Vision to Red-Green ad Blue-Yellow Chromatic Gratings", XP-002281432, Database Medline, U.S. National Library of Medicine (Feb. 1985).
Sakana, et al., "Television", vol. 31, pp. 29-36 (1976).

* cited by examiner

*Primary Examiner*—Kevin M Nguyen
(74) *Attorney, Agent, or Firm*—Fitzpatrick, Cella, Harper & Scinto

(57) ABSTRACT

An image display panel of the reflection type includes, in a multilayer structure, a first layer including a periodic planar arrangement of a plurality of electrophoretic elements, each showing one of an opaque black state and a transparent state in response to an input signal, and a second layer including a periodic planar arrangement of a plurality of electrophoretic elements, each showing at least a first color state and a second color state in response to an input signal. An arrangement period of the electrophoretic elements included in the first layer is smaller than an arrangement period of the electrophoretic elements included in the second layer.

10 Claims, 5 Drawing Sheets

COLOR IMAGE DISPLAY PANEL AND DRIVING METHOD THEREOF

TECHNICAL FIELD

The present invention relates to a color image display panel and a driving method thereof. More specifically, it relates to a color image display panel having a multilayer structure of a bright-dark modulation layer causing a transparent/opaque change, and a color modulation layer.

BACKGROUND ART

Among the image display panels, there are known a cathode ray tube (CRT), a plasma display panel (PDP), an electroluminescence panel (ELP) etc., utilizing a light-emitting material, and a liquid crystal display (LCD), a dynamic micromirror display (DLP), an electrophoretic display (EPD) etc., utilizing an optical switch element not emitting light.

A high-definition color image display panel is generally constituted of an assembly of plural pixels arranged planarly in a matrix arrangement. Also each pixel is often constituted of subpixels for modulating three lights based on three primary colors of the human vision.

In practice, the aforementioned subpixels are formed by further dividing a pixel in the plane. In such case, since an area of the subpixel for a color display is decreased to a fraction according to the number of division, so that the entire display image becomes darker. In an image display panel of the non-light-emitting type, an illumination with a bright back light or front light is often employed in order to compensate such decrease in brightness. In an image display panel of the non-light-emitting reflective type, not provided with such illuminating means, an anisotropic reflective layer is employed to increase the display brightness in a standard viewing position about in front of the image display panel.

Japanese Patent Application Laid-open No. H11-84403 proposes a two-layer laminated configuration without color filters, formed by a color cell of three primary colors utilizing an areal division but obtained by a liquid crystal containing a dye guest, and a liquid crystal cell containing a black dye guest, thereby increasing a brightness in a white state.

Japanese Patent Application Laid-open No. H10-68967 discloses superposing two layers of a cell which can take one of three primary colors and a colorless transparent state thereby increasing the brightness in a white state and rendering each of the three primary colors brighter than in the case of division into three areas.

On the other hand, plural proposals have been made for a possibility of providing a color image which is bright in principle, without relying on subpixels based on areal division. In a principal proposal, a light modulation layer is formed as a multi-layered configuration, thereby superposing the subpixels in a direction perpendicular to the display plane. For example, a wavelength-selective reflecting layer, for example, based on cholesteric liquid crystals is superposed in plural layers, and a color image is reproduced by an addition color mixing by the subpixels in a direction perpendicular to the image plane. Also in another example, a layer of a material of dichroic property such as guest-host liquid crystals is superposed in plural layers, and a color image is reproduced by a subtraction color mixing in a direction perpendicular to the image plane.

In the handling of image data, such as an image signal of a color television broadcasting, or image recording data of a DVD-video, a DV camera or a digital still camera, a certain data compression is often adopted. As one of the compression technologies, a data reduction in color signals is frequently executed.

FIG. 7 shows a result of measurement of the spatial frequency characteristics of human vision, reported by Sakata and Isono, Television, Vol. 31, p. 29(1976). In the human visionary characteristics, it is known, as illustrated, that the spatial frequency detecting sensitivity for the luminance becomes highest at about 3 cycle/degree, while that for the color hue becomes highest at about 0.5 cycle/degree. Also it is known, among the color hues, that the spatial frequency detecting sensitivity shows a larger decrease at the high frequency side in a yellow-blue complementary color system than in a red-green complementary color system. Since the spatial resolving power of the human for color is lower than the spatial resolving power for luminance, a reduction of the color information is effective in the aforementioned image signal compressing technologies.

Despite that the spatial resolving power for luminance information is relatively high and that for color information is relatively low in the human vision, a prior color image display panel displays color hue information corresponding to a high resolving power. More specifically, the brightness of a pixel is displayed by controlling subpixels which respectively display three primary colors.

Such display not only provides excessive information unnecessary for the human vision, but also is associated with drawbacks of a decrease in a pixel opening ratio and an increase in the process cost, resulting from a finer structure of the subpixels and increased drive wirings therefor. However, in case the size of the subpixel is increased, a pixel formed by an assembly of the subpixels becomes larger, so that the luminance information cannot be displayed with a sufficient resolving power. The present invention is to provide a bright color display panel of a satisfactory display resolving power at a low cost. Thus, the issues to be solved are to secure a brightness of the displayed image, to secure a display resolving power and to reduce a production cost.

DISCLOSURE OF THE INVENTION

A color image display panel of the present invention is a color image display panel having, in a multilayer structure, a first light modulating layer and a second light modulating layer each comprising a periodical planar arrangement of a plurality of light modulating elements for modulating a color or a brightness of an incident light in response to an input signal, wherein the arrangement period of the light modulating element in the first light modulating layer is smaller than the arrangement period of the light modulating element in the second light modulating layer.

In another aspect, the color image display panel of the present invention is characterized in that a first light modulating layer comprising an arrangement of light modulating elements for modulating brightness and a second light modulating layer comprising an arrangement of light modulating elements for modulating color are superposed.

In still another aspect, the color image display panel of the present invention is characterized in that a light modulating layer for modulating color comprising light modulating elements having a red color state and a green color state and light modulating elements having a blue color state and a transparent or white state, and a light modulating layer for modulating brightness are superposed.

A driving method for a color image display panel of the present invention is method for driving an image display panel having, in a multilayer structure, a first light modulating layer comprising a periodical planar arrangement of a plurality of light modulating elements for modulating a brightness of an incident light in response to an input signal and a second light modulating layer comprising a periodical planar arrangement of a plurality of light modulating elements for modulating a color of an incident light in response to an input signal, wherein a spatial frequency component of a drive signal applied to the first light modulating layer is higher than a spatial frequency component of a drive signal applied to the second light modulating layer.

In another driving method of the present invention, for an image display panel having at least two light modulating layers each comprising a periodical planar arrangement of a plurality of light modulating elements for modulating color of an incident light and a plurality of light modulating elements for modulating brightness of an incident light, the method is characterized by employing, in a display area where a drive signal applied to the aforementioned light modulating element for modulating brightness contains a large proportion of a high spatial frequency component, a drive signal for driving the aforementioned light modulating element for modulating color in such a manner that such element has a relatively brighter color.

In another aspect, a driving method of the present invention is a method for driving an image display panel having at least two light modulating layers of a light modulating layer comprising a periodical planar arrangement of a plurality of light modulating elements for modulating a brightness of an incident light in response to an input signal and a light modulating layer comprising a periodical planar arrangement of a plurality of light modulating elements for modulating a color, wherein such a drive as to compensate an offset from a predetermined position generated between said brightness modulating layer and said color modulating layer is conducted.

In the color image display panel of the invention of the aforementioned configuration, a desired color image can be displayed by a brightness control by the first light modulating layer and by a color hue control by the second light modulating layer. Since the first light modulating layer corresponding to the brightness observation in human vision has a smaller periodical structure in comparison with that in the second light modulating layer corresponding to the color hue observation, the color image display panel of the present invention has sufficient bright/dark display resolving power. In comparison with the aforementioned bright/dark resolving power, the color display resolving power of the second light modulating layer is relatively lower, but matching the human visionary characteristics, it does not constitute a problem but helps to improve the opening ratio and to facilitate the production in the second optical modulating layer. Also such a feature that the second optical modulating layer has a larger repetition period than in the first layer also increases a tolerance for displacement in an alignment of the first layer and the second layer, thereby facilitating the production of the color image display panel.

The color image display panel of the present invention has many advantages as shown in the following. It can provide a brighter and sharper color display than in a color display panel of a one-layer structure. Also it can provide a high-definition display with respect to bright and dark levels. It has a sufficient display ability matching the human visionary characteristics. It can reduce a number of switch elements in pixel driving circuits. It is adapted for displaying an image of compressed data used for broadcasting and recording. Besides it has a margin in the working precision at the manufacture, thereby allowing to improve the production yield and to reduce the production cost.

The driving method for the image display panel of the present invention can provide a sharpness in color display and a high definition in bright/dark levels in human observation. Also it provides a margin in the working precision at the manufacture of the image display panel, thereby allowing to improve the production yield and to reduce the production cost of the image display panel.

BEST MODE FOR CARRYING OUT THE INVENTION

In the following, a color image display panel of the present invention will be explained in more details with reference to the accompanying drawings.

Figure 1:
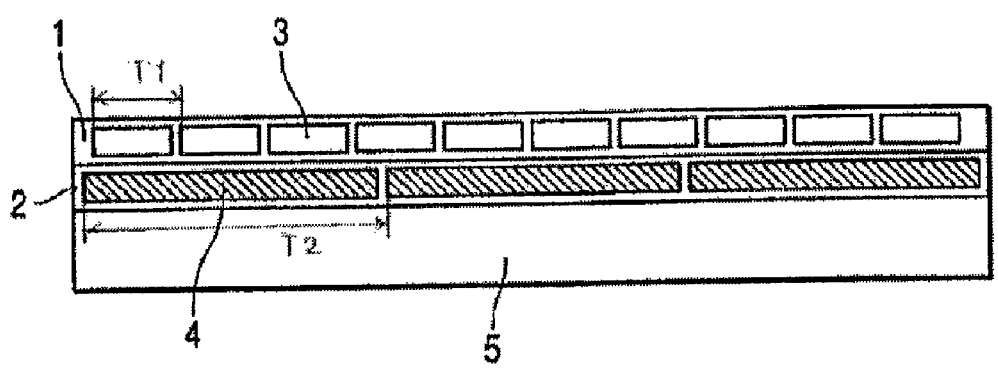
FIG. 1 is a cross-sectional view showing a structure of a display device of the present invention.

As shown in FIG. 1, the image display panel of the present invention includes at least two light modulating layers. Referring to FIG. 1, first and second light modulating layers 1 and 2 are provided on a substrate 5. The light modulating layers are respectively formed by an arrangement of light modulating elements 3 and 4, which constitute a modulating unit. For the light modulating element 3 or 4, there can be employed a light modulating element of various kinds as explained in the foregoing. The substrate 5 can be selected from a transparent material such as glass or plastics to obtain an image display panel of the transmission (rear illumination) type. In case of an image display panel of the transmission type, a diffusing plate or a light guide plate (not shown) for rear illumination may be provided in the back. In case of constructing an image display panel of the reflection (front illumination) type, the substrate 5 need not necessarily be transparent but may also be constituted of a silicon or metal material. In case of an image display panel of the reflection type, a reflection layer (not shown) such as a light reflecting layer by a metal or a light scattering layer by a white pigment is provided on the substrate surface. Also an illuminating light guide plate (not shown) may be provided at the front side. In addition, as in an ordinary image display panel, there may be provided a display antireflection layer, a surface diffusion layer, a surface hardening layer etc. (none illustrated) for improving optical characteristics.

The aforementioned light modulating layer is formed by a planar arrangement of light modulating elements according to a predetermined periodical structure. The aforementioned light modulating element is an element for modulating an incident light. The modulation used herein means a change in a level of at least one phenomenon of transmission, absorption, reflection and refraction on an incident light in response to a control signal.

Such light modulating element is known by various types, but most widely used one is that using liquid crystals. An optical element utilizing liquid crystals can change an orientation or an arrangement of the liquid crystal based, for example, on an external electric field, based on an anisotropy of the liquid crystal in electrical properties, thereby controlling the optical characteristics of the liquid crystal and modulating the light entering the liquid crystal. There is also known an optical modulation utilizing a temperature-dependent change in the liquid crystal phase. As the liquid crystal, a nematic material, a chiral nematic material, a cholesteric material etc., can be utilized.

As another light modulating element, a micromirror element is also known. In this element, a small mirror is formed by a micro-fabrication technology such as lithography, and means of applying an external force such as an electrostatic field is provided. The mirror is changed in its position or its direction by the means for applying the external force, thereby modulating a light entering the mirror.

As another light modulating element, there is also known an optical shutter utilizing Pockels effect or Kerr effect. Such element utilizes a birefringent material which shows a change in a refractive index by an electric field and is known to have a rapid response.

As another light modulating element, an electrophoretic element is also known. This element executes light modulation by moving charged particles including colored particles, utilizing means for providing an electrostatic field. This element is known for types utilizing white particles, black particles, or particles colored in black and white.

As another light modulating element, a charged powder element is also known. This display element utilizes a movement of colored particles in gas by an electrostatic field.

As another light modulating element, an electrochromic element is also known. This element includes a material of which colored state changes by an electrochemical redox reaction, and electrodes which causes such electrochemical reaction.

As another light modulating element, a phase-change light scattering element is also known. This element obtains a transparent state and a light scattering state, by controlling a phase separation or a formation of an inhomogeneous state of a medium, utilizing phase-change means such as heat or an electric field.

As another light modulating element, a light switch element utilizing an electrowetting phenomenon is also known. It utilizes a liquid displacement caused by a change in the wetting of a solid substrate by a liquid, based on a change of a surface tension of the liquid under an electric field, and executes a switching of an incident light by controlling matching/unmatching of the refractive index at the interface.

The image display panel of the present invention is characterized in that a repetition period $T_1$ of the arrangement of the aforementioned light modulating element 3 does not coincide with a repetition period $T_2$ of the arrangement of the aforementioned light modulating element 4. FIG. 1 shows an example in which $T_1:T_2$ is about 3:10, but such example is not restrictive and it is effective to have a $T_2/T_1$ value within a range of 1.5 to 20, preferably within a range of 2 to 6. The first light modulating layer of a shorter repetition period has a function of principally modulating brightness, while the second light modulating layer has a function of principally modulating color hue. The image display panel is provided with an arrangement of the light modulating element generally not one-dimensionally but two-dimensionally. The $T_2/T_1$ value need not necessarily be the same as mentioned above in a cross-sectional direction other than that shown in FIG. 1. The present invention is effective as long as the $T_2/T_1$ ratio is within the aforementioned range in a specified direction, and $T_2$ may be the same as $T_1$ in another direction.

The light modulating element is provided with signal input means (not shown) for causing a state change thereof, and optical characteristics can be modified by applying an electric field or heat to each element. Such signal input means can be realized by forming, in the image display panel, for example, electrodes with a simple matrix wiring or an active matrix circuit such as formed by TFT. It is also possible to provide an input signal, for example, by applying an electric field with a needle electrode from the exterior of the image display panel, by executing a local heating with a thin film heater, or by applying a radiation by an optical system. Such signal input means for image formation is already known in the related art.

Now there will be given an explanation on an input signal to be applied in displaying an image with the color image display panel of the present invention. In the following description, reference is made to a spatial frequency in an input image and a spatial frequency in an image display panel, and, for the purpose of comparison of the two, they will be normalized by a size of the image and of the image display panel. More specifically, when a vertical or horizontal dimension of a two-dimensional image is normalized to 1, a spatial frequency in the vertical or horizontal direction is called a spatial frequency of the image. Also when a vertical or horizontal dimension of an image display panel is normalized to 1, a spatial frequency of the repetition of the arrangement of the light modulating element in the vertical or horizontal direction is called a spatial frequency of the light modulating element.

Input signals to be applied to the color image display panel of the present invention are a bright/dark signal for the first light modulating layer, and a color hue signal for the second light modulating layer. In a color image display panel, it is not possible, in principle, to faithfully display an input signal of a period shorter than a repetition period of the arrangement of the light modulating element, so that the input signal can be subjected, by a high-cut filter, to suppression of components higher than a half of the spatial frequency of the image display panel. In the color image display panel of the present invention, since the second light modulating element has a lower spatial frequency than the spatial frequency of the first light modulating element, a cut-off frequency is accordingly made lower in the color hue signal than in the bright/dark signal. Since the spatial resolving power of human vision is lower for the color hue than for the bright/dark level, the aforementioned difference in the cut-off frequencies does not impose a serious influence on the image quality when a displayed image is observed by a human.

Also in a position where a luminance (bright/dark) signal component of the image signal has a high spatial frequency, a priority may be given to the display of a bright/dark contrast, rather than the color reproduction. More specifically, in a region where the spatial frequency components of a signal supplied to the first layer contain a large proportion of high-frequency components close to a half of the spatial frequency of the arrangement of the light modulating element in the first layer, the color hue signal applied to the second layer may be modified to such a signal as to display a color of a higher brightness, in comparison with the color by the original input signal. A drive signal application for image display to the color image display panel of the present invention in the aforementioned manner suppresses the color signal and enhances the bright/dark contrast in a region where the bright/dark spatial frequency is higher, thereby providing an image of a sharper impression. Such method is particularly effective, for example, in case of clearly displaying character information.

In superposing the first light modulating layer and the second light modulating layer, these two layers may not match with designed positions, for example, because of an aligning precision or a thermal deformation of the substrate. In the image display panel of the present invention, in spite of presence of plural light modulating layers, such positional aberration does not always constitute a fatal defect because both layers are designed with unmatching periods. There can be tolerated an aberration of about a half of the size of the element 4 in the second light modulating layer, having a larger repetition period. This is because the human has a lower resolving power for the color, displayed by the second light modulating layer. In case the first light modulating layer and the second light modulating layer show a large aberration, it is also possible to separately measure an offset amount of such aberration and to apply, at the application of an input signal, a drive signal which is displaced by such offset amount in an opposite direction, thereby compensating the aberration.

The aforementioned processing on the input signal may be executed by a software for handling the image signal, or a hardware provided in a drive circuit of the image display panel, or by microcodes in a driving integrated circuit of the image display panel.

Figure 2:
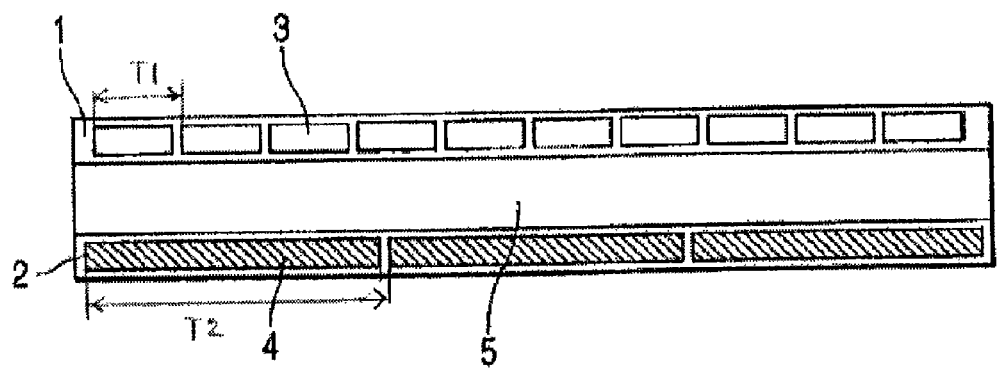
FIG. 2 is a cross-sectional view showing a structure of another display device of the present invention.

FIG. 2 is a schematic view of another embodiment of the present invention. A first light modulating layer and a second light modulating layer are provided on opposite sides of a substrate 5. Such arrangement is convenient for utilizing the two surfaces of the substrate, as wiring surfaces for the signal input means respectively for the first light modulating layer and the second light modulating layer. This embodiment is different from the embodiment shown in FIG. 1 in that the substrate 5 has to be formed by a transparent material. Other materials, unillustrated members, signal input means etc., are the same as those in the first embodiment.

Figure 3:
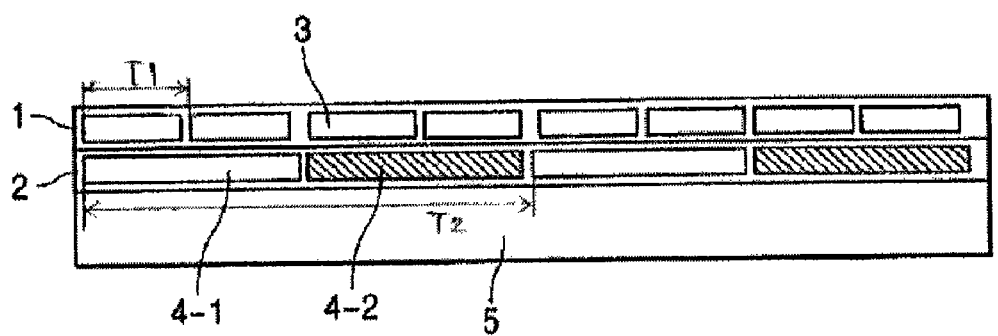
FIG. 3 is a cross-sectional view showing a structure of another display device of the present invention.

FIG. 3 is a schematic view of still another embodiment of the present invention. First and second light modulating layers 1, 2 are provided on a substrate 5. The light modulating layers are respectively formed by arrangements of light modulating elements 3, 4. The light modulating element 4 is constituted of elements 4-1, 4-2 of the two kinds, providing different changes in color, thereby increasing a multi-color display ability in comparison with the case of utilizing an element of one kind. As an example of the color hue change in the aforementioned two elements, the element 4-1 shows a red-yellow-green color change, while the element 4-2 shows a white-blue (or black-blue) color change. The sizes of the elements 4-1 and 4-2 need not necessarily be the same but can be determined in consideration of an image to be displayed on the image display panel and relative brightnesses of the color-changing elements 4-1 and 4-2.

Now there will be given a brief explanation on a color display drive for the display device shown in FIG. 3. For displaying a red color of a highest saturation in this device in a desired area, an element 4-1 contained in a desired area of the second light modulating layer is brought to a red state by the unillustrated signal input means. Also among the elements 3 in the first light modulating layer, only elements 3 in such a position as to cover the element 4-1 are made bright (light transmitting state), while elements 3 in such a position as to cover the element 4-2 are made dark (light non-transmitting state). In case the element 4-1 and the element 4-2 have the same dimension as shown in FIG. 3, the red color is displayed by the element 4-1 with an overall opening ratio of about 50% (for the purpose of simplicity, there is assumed an ideal state where the element itself has an opening ratio of 100% and a partition between the elements has a zero thickness). Also a green color can be obtained in a desired area by a similar drive as explained above, except that the element 4-1 is driven into a green color. For obtaining a blue color display, the element 4-2 is driven into a blue color, and, in the first light modulating layer, only elements 3 in such a position as to cover the element 4-2 are maintained in a bright state, while elements 3 in such a position as to cover the element 4-1 are maintained in a dark state. As explained above, each area displaying red, green or blue has an overall opening ratio of about 50%. On the other hand, in a color image display panel in which a pixel is constituted of three subpixels of red, green and blue primary colors divided in the plane, Each of the red, green and blue displays has an overall opening ratio (assuming an ideal configuration the same as above) of 33%. Therefore the color display device shown in FIG. 3 can display colors which are brighter by 1.5 times. A decrease in the brightness can be achieved by shifting the optical elements 3 of the first light modulating layer, maintained in the bright state as explained above, to a dark state by a necessary amount.

Figure 4:
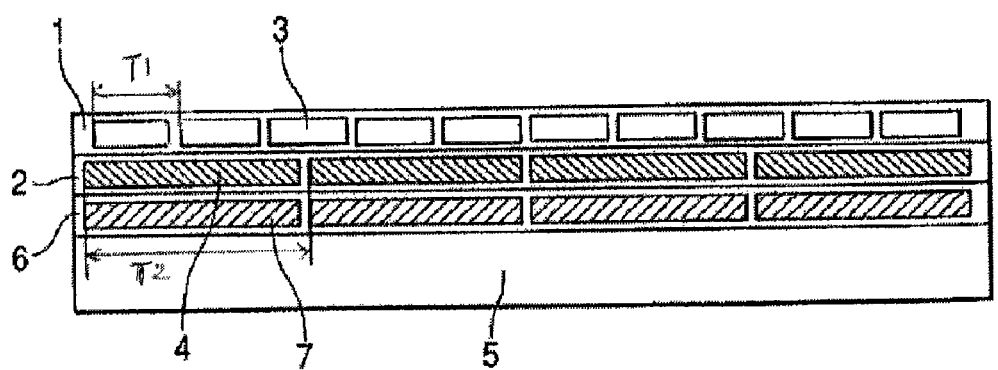
FIG. 4 is a cross-sectional view showing a structure of another display device of the present invention.

FIG. 4 shows still another embodiment of the present invention, wherein the second light modulating layer has a two-layered structure. The first light modulating layer 1 is similar to that in the foregoing embodiment shown in FIG. 3. The second light modulating layer is constituted of two layers 2 and 6. A light modulating element 7 in the layer 6 has the properties required for the second light modulating layer of the first embodiment. Therefore, a light modulating element showing a red-yellow-green color change, explained in relation to FIG. 3, can be advantageously employed. The light modulating element 4 in the light modulating layer 2 in FIG. 4 is required to be capable of a color modulating operation as in the light modulating layer 6, and also to have a light transmitting property at least in a part of the light modulating operation. Examples of the light modulating element capable of such modulating operation include a dichroic liquid crystal element, a cholesteric liquid crystal element, a horizontal drive electrophoretic element and an electrochromic element. For example, a light modulating element showing a blue-colorless (transparent) change can be advantageously employed as the light modulating element 4 in FIG. 4. In FIG. 4, colors of the light modulating elements 4 and 7 is not limited to the above-mentioned combination. A multi-color display can be realized by any combination employing a light modulating element, capable of displaying two colors within three primary colors of red, green and blue, as the element 7 shown in FIG. 4 and a light modulating element capable of displaying the remaining color and a colorless state as the element 4.

In any of the foregoing embodiments, modulation signal input means for the light modulating element is not illustrated, but, in case the image display panel is utilized as a transmission display panel, such signal input means should be made transparent, or, in case it is opaque, it should be accommodated within a sufficiently narrow area with respect to the area of the image display panel, in order to suppress a loss of the aperture area ratio of the image display panel. In case the image display panel is used as the non-transmission type, there can be provided an opaque layer over the entire area, so that the modulation signal input means positioned closest to the substrate 5 can be formed with an opaque material. However, at a surface side of the light modulating layer provided thereon, there is required signal input means which is so designed as to suppress the loss of the opening ratio of the image display panel as explained in the foregoing.

Figure 5:
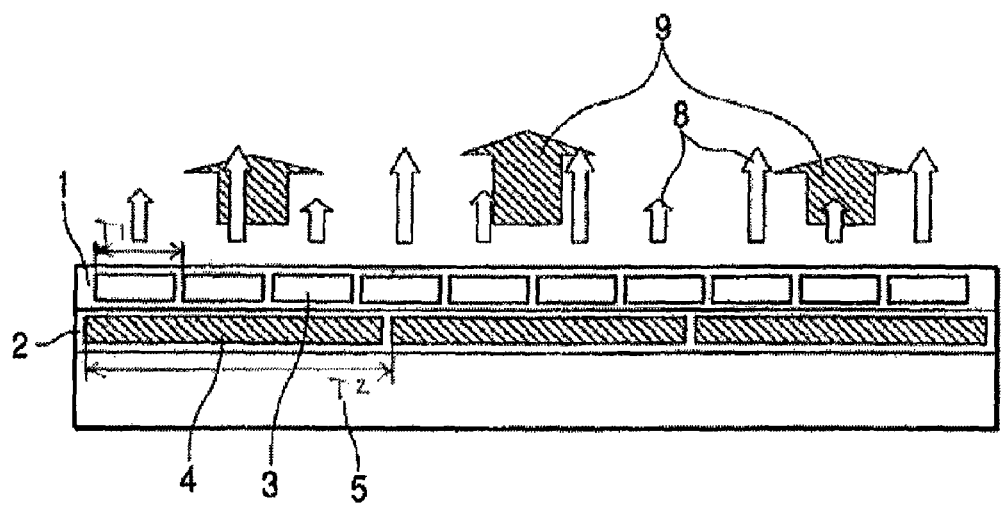
FIG. 5 is a view explaining a display operation of a display device of the present invention.

FIG. 5 is a conceptual view showing a display operation of the image display panel of the present invention, shown in FIG. 1. A light modulating layer 1 is formed by an arrangement of a light modulating element 3 having a transparent state and an opaque black state, thus being capable of modulating the brightness of a transmitted light. A light modulating layer 2 is formed by an arrangement of a light modulating element 4 showing a color change, thereby being capable of a color change. Referring to FIG. 5, the first light modulating layer for brightness modulation is constituted of the light modulating elements 3 of a relatively small area, so that the bright/dark level of a transmitted light 8 can be modulated with a high spatial frequency by controlling each light modulating element with a signal input. On the other hand, the second light modulating layer for color modulation is constituted of the light modulating elements 4 of a relatively large area, so that a colored light 9, transmitted by a control according to an input signal, is modulated with a relatively low spatial frequency.

Figure 7:
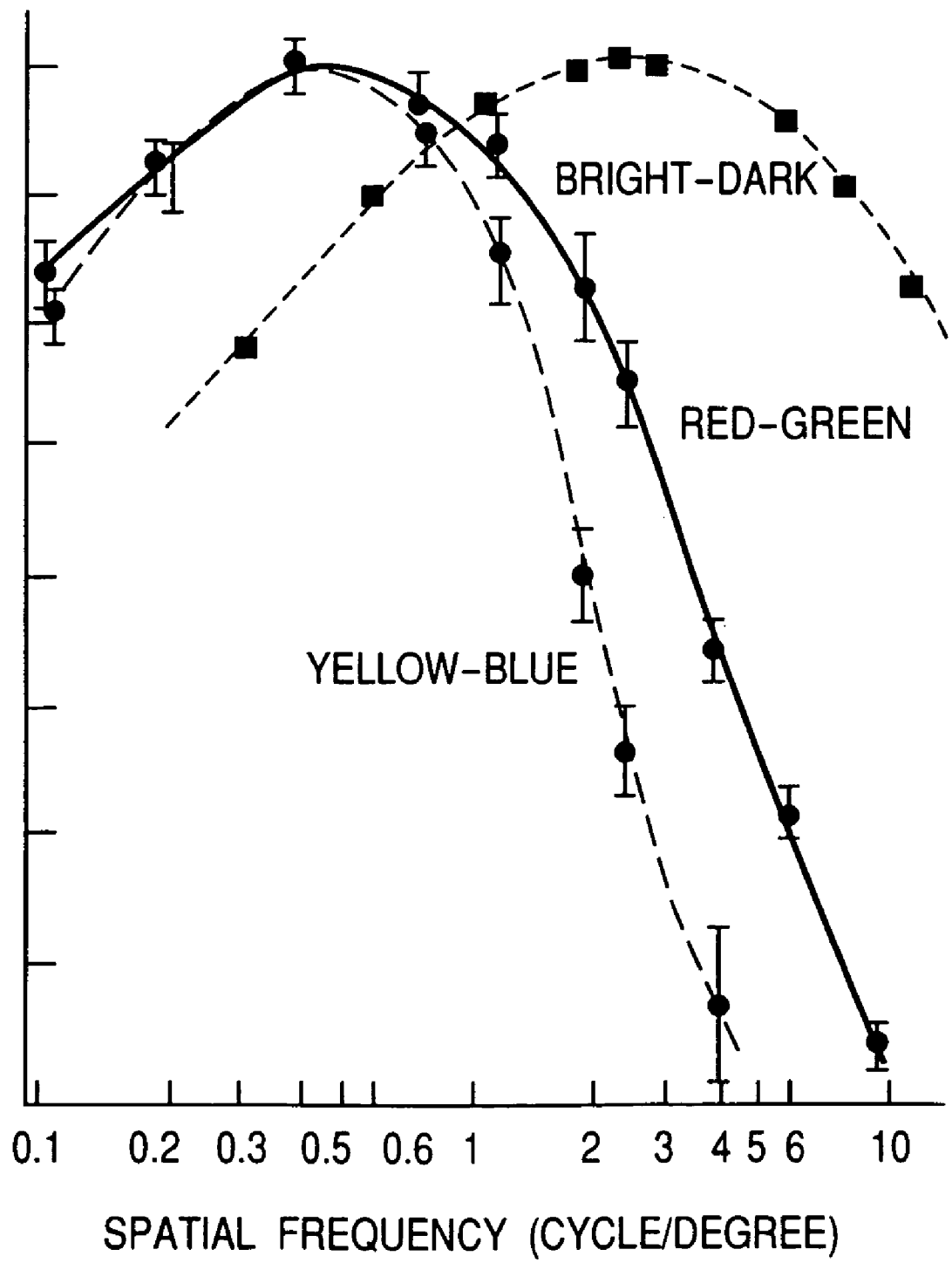
FIG. 7 is an example of a report of measurement of angular resolving power of human vision.

The aforementioned lower spatial frequency for the modulation on color does not necessarily constitute a defect. FIG. 7 shows data of a report on the measurement of human visionary angular resolving power by Sakata et. al. Since the resolving power on color is lower than the resolving power on bright/dark level, an ability to display a high spatial frequency in color is unnecessary in a display panel for human observation.

Example 1

Figure 6:
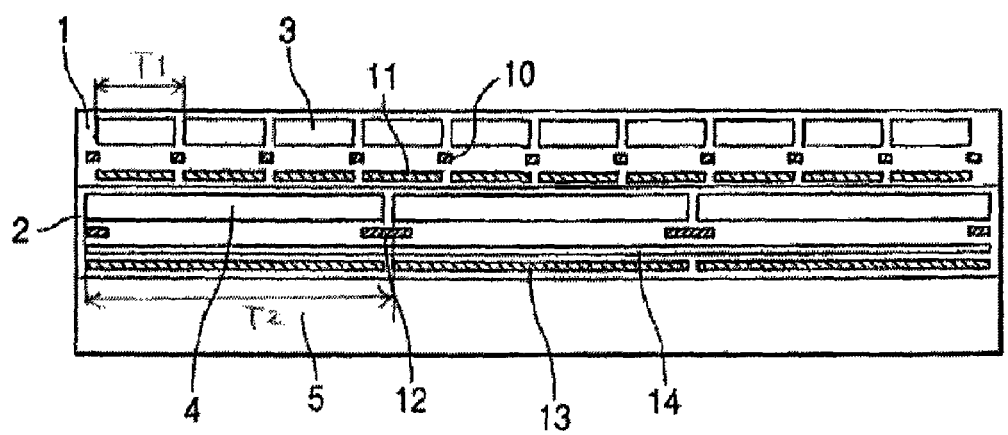
FIG. 6 is a cross-sectional view showing a structure of a specific example of the present invention.

In the following, a specific example of the color image display panel of the present invention, having a configuration shown in FIG. 1, will be explained with reference to FIG. 6. It is to be noted that the present invention is not limited to such example.

A polyester film of a thickness of 200 µm was washed, and an aluminum layer was deposited thereon and was subjected to a photolithographic process to prepare drive electrodes 13 of a width of 330 µm, with a spacing of 10 µm. Their surface was covered with a two-liquid curable acrylic resin layer of 1 µm, and then an urethane resin layer, in which a titanium oxide white pigment was dispersed, was formed with a thickness of 8 µm to constitute a scattering reflection layer 14. Again the two-liquid curable acrylic resin layer was applied by 1 µm, and then an aluminum layer was deposited and subjected to a photolithographic process to form a stripe-shaped common electrode 12 of a width of 10 µm. Utilizing a photolithography of a thick film resist, a partition with a height of 25 µm was prepared on the common electrode 12. A section surrounded by the partition was filled with a non-polar solvent (ISOPAR-H, manufactured by Exxon-Mobil Inc.) containing polystyrene-polymethyl methacrylate resin particles dyed with a red dye and having an average particles size of 5 µm by 3 wt. % and cobalt naphthenate by 0.2 wt. %, and then a polycarbonate film of a thickness of 5 µm, surfacially coated with a acrylic photosettable resin, was put thereon followed by sealing by an ultraviolet irradiation, thereby forming a second light modulating layer 2 in which the light modulating element 4 was periodically arranged.

A polyester film of a thickness of 65 µm, bearing an indium tin oxide conductive layer on its surface, was subjected to a photolithographic process to form driving electrodes 11 of a width of 95 µm, with a spacing of 5 µm. After the surface was covered with a two-liquid curable acrylic resin layer of a thickness of 2.5 µm, an aluminum layer was deposited and was subjected to a photolithographic process to prepare a stripe-shaped common electrode 10 of a width of 5 µm. Utilizing a photolithography of a thick film resist, a partition of a height of 11 µm was prepared on the common electrode 10. A section surrounded by the partition was filled with a non-polar solvent (ISOPAR-H, manufactured by Exxon-Mobil Inc.) containing polystyrene-polymethyl methacrylate resin particles containing a black pigment and having an average particles size of 2.5 µm by 3 wt. % and cobalt naphthenate by 0.2 wt. %, and then a polycarbonate film of a thickness of 5 µm, surfacially coated with a acrylic photosettable resin, was put thereon followed by sealing by an ultraviolet irradiation, thereby forming a first light modulating layer 1 in which the light modulating element 3 was periodically arranged. The first light modulating layer 1 was adhered to the second light modulating layer 2, prepared in advance, with an aerophobic adhesive material to obtain an image display device of a configuration shown in FIG. 1.

In the first light modulating layer 1 of the two-layered electrophoretic display panel of the aforementioned configuration, there were displayed three rows of a Japanese text of a full-size characters of a size of 9 dots in the vertical and horizontal directions. More specifically, among the drive electrodes 11 of the light modulating elements 3 corresponding to character displaying pixels in the first light modulating layer 1, a negative input signal was given to the common electrode 10 to obtain a black state, and a positive input signal was given to the drive electrodes of other light modulating elements 3 to obtain a transparent state. The aforementioned text had a spacing of 1 dot between the characters in the horizontal direction, and a spacing of 3 dots between the lines in the vertical direction. Characters displayed in black color on a somewhat reddish white background were small, but the text was legible with bare eyes from a distance of 20 cm. Then, within the light modulating elements 4 of the second layer, the input signal to the drive electrode 13 was inverted for three columns only in the display area of the character train of the second row in the three-row text. Thus the background was changed to a red color only in the second row, among the character train of three rows. The characters with such red background were also legible with bare eyes. Then, with respect to the light modulating elements 4 of the three columns in the second layer, shifted to the red display state, an input signal to the center column was again inverted. This state was felt with the visual observation as if the entire background of the characters in the second row became brighter with a decrease of the red color, and it was difficult to recognize that the background of the character was changed to white only in the central part in the vertical direction. This result indicates that the display is enough for the human observation, in spite of the fact that the second light modulating layer 2 has a display resolving power of ⅓ of the display resolving power of the first light modulating layer 1. The display by such image display panel is sufficiently usable in an application of displaying a high-definition black-and-white text and emphasizing a part of the text by changing its background to a red color.

The foregoing example has shown an example of employing electrophoretic elements for the two light modulating elements, but the image display panel of the present invention can naturally be produced by employing TN liquid crystal elements, guest-host type liquid crystal elements or light modulating elements of other types.

Example 2

Figure 8:
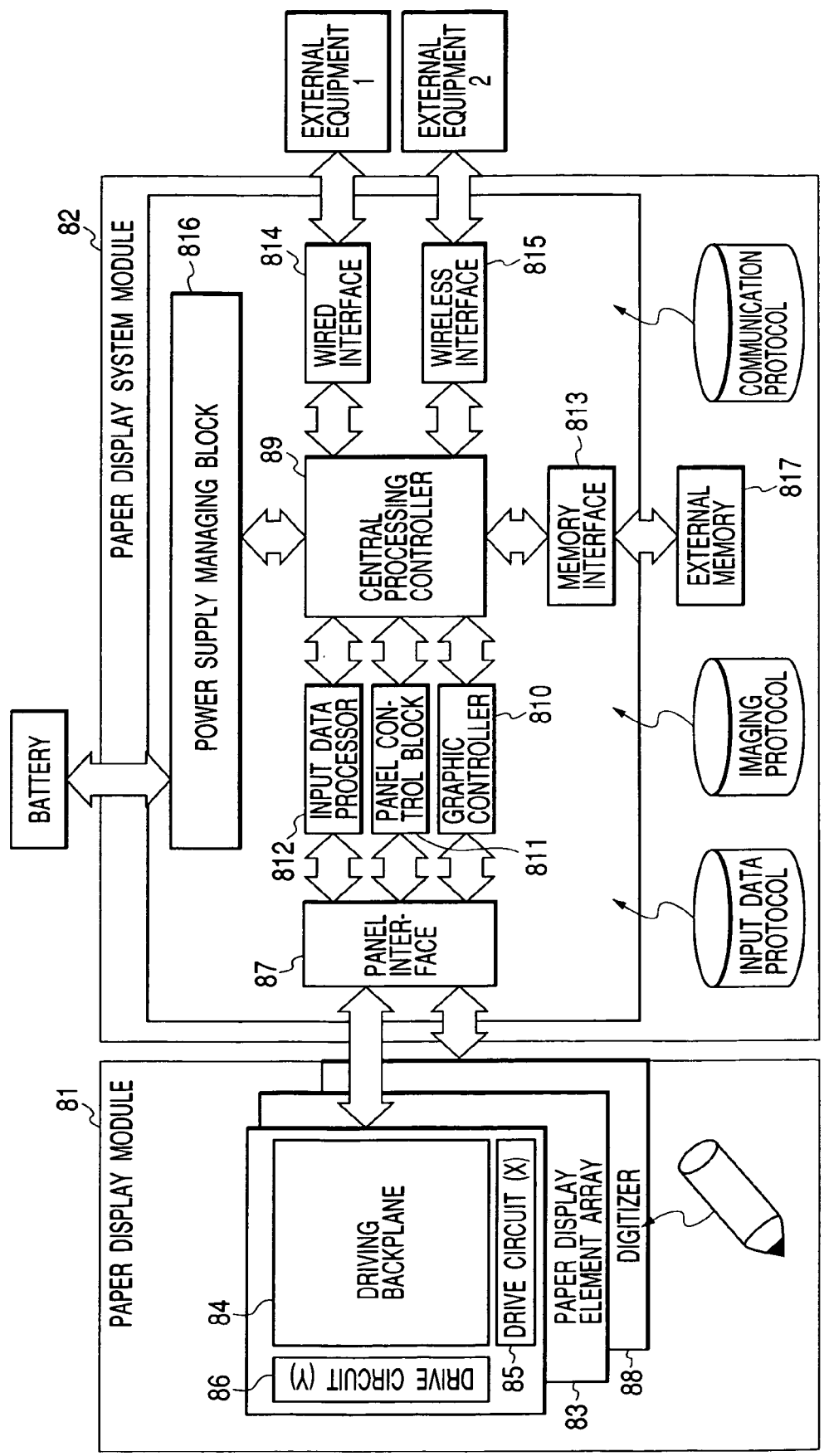
FIG. 8 is a block diagram showing functions of an equipment system utilizing a paper display of the present invention.

FIG. 8 is a functional block diagram of a paper display utilizing an electrophoretic display apparatus of the invention, and an equipment system utilizing such paper display.

The functional blocks are mainly divided into two, one being a paper display module 81 and the other being a paper display system module 82.

The paper display module 81 is constituted of a paper display element array 83, a driving backplane 84, a drive circuit (X) 85 and a drive circuit (Y) 86, and a panel controller (not shown) may be additionally provided for supplying the driving backplane 84 and the drive circuits 85, 86 with an electric power and signals. An interface module 87 may also serve as such panel controller. Also a temperature detecting element (not shown) such as a thermocouple or a thermistor may be provided for a temperature compensation control. Also the paper display module 81 may include a digitizer 88. Such digitizer can be of various types, such as an electromagnetic induction type, a resistance film type, or an optical reading type in which a pen is provided with an image pickup device, a data processing function and a data transfer function.

The paper display system module 82 is provided, around a central processing controller 89 (generally composed of a micro processor unit: MPU), with main panel control function blocks such as a graphic controller 810, a panel control block 811, and an input data processor 812, communicational function blocks for external data exchange as in an external communication interface, including a memory interface 813 for managing an external memory 817, a wired interface 814 and a wireless interface 815, and a power supply managing function block 816. On the paper display system module 82, there are installed an operating system (OS) for operating various applications and application softwares, but the present description will be limited to configurations common to the paper display.

The illustration is a block diagram illustrating the functions, and various variations are possible for the hardware configuration.

For example, the drive circuit (X) 85 and the drive circuit (Y) 86 may be monolithically formed on the driving backplane 4. The digitizer 88 may be constructed in a similar manner.

Data exchange between the paper display module 81 and the paper display system module 82 may be executed in a wired method or wireless method. In case of wireless connection, the paper display module 81 has to be equipped with a power source, a power generating function, or a wireless energy transfer function.

The paper display module 81 and the paper display system module 82 are illustrated in a 1:1 relationship, but they may also be constructed in a n:1 relationship.

The paper display of the present embodiment can be utilized as a display unit of a portable information terminal (personal digital assistance: PDA). It can also be employed as a display unit of a tablet PC, an electronic notebook, an electronic textbook, a document viewer, an electronic book, an electronic newspaper etc.

The invention claimed is:

1. An image display panel of the reflection type comprising, in a multilayer structure:
   a first layer including a periodic planar arrangement of a plurality of electrophoretic elements, each of the plurality of electrophoretic elements included in the first layer showing one of an opaque black state and a transparent state in response to an input signal; and
   a second layer including a periodic planar arrangement of a plurality of electrophoretic elements, each of the plurality of electrophoretic elements included in the second layer showing at least a first color state and a second color state in response to an input signal,
   wherein each of the plurality of electrophoretic elements has a drive electrode and a common electrode, and a display state is controlled by an input signal given between the drive electrode and the common electrode,
   wherein drive electrodes for the electrophoretic elements included in the first layer are smaller in surface area than drive electrodes for the electrophoretic elements included in the second layer, and
   wherein the electrophoretic elements included in the first layer and the electrophoretic elements included in the second layer are respectively individually controlled.

2. The image display panel of the reflection type according to claim 1, wherein the second layer includes a first electrophoretic element and a second electrophoretic element, the first electrophoretic element having a green state and a red state, and the second electrophoretic element having a blue state.

3. The image display panel of the reflection type according to claim 1, wherein each of the electrophoretic elements in the first layer is modulated with a high spatial frequency.

4. The image display panel of the reflection type according to claim 1, wherein each of the electrophoretic elements in the second layer is modulated with a low spatial frequency.

5. An image display panel of the reflection type comprising, in a multilayer structure:
   a first layer including a periodic planar arrangement of a plurality of electrophoretic elements, each of the plurality of electrophoretic elements included in the first layer showing only one of an opaque black state and a transparent state in response to an input signal; and
   a second layer including a periodic planar arrangement of a plurality of electrophoretic elements, each of the plurality of electrophoretic elements included in the second layer showing at least a first color state and a second color state in response to an input signal,
   wherein the electrophoretic elements included in the first layer are smaller in area than the electrophoretic elements included in the second layer.

6. An image display panel of the reflection type according to claim 5, wherein each of the electrophoretic elements in the first layer is individually controlled with an input signal.

7. The image display panel of the reflection type according to claim 6, wherein each of the electrophoretic elements in the first layer is modulated with a high spatial frequency.

8. An image display panel of the reflection type according to claim 5, wherein each of the electrophoretic elements in the second layer is individually controlled with an input signal.

9. The image display panel of the reflection type according to claim 8, wherein each of the electrophoretic elements in the second layer is modulated with a low spatial frequency.

10. The image display panel of the reflection type according to claim 5,
    wherein each of the plurality of electrophoretic elements has a drive electrode and a common electrode, and a display state is controlled by an input signal given between the drive electrode and the common electrode, and
    wherein drive electrodes for the electrophoretic elements included in the first layer are smaller in surface area than drive electrodes for the electrophoretic elements included in the second layer.

* * * * *